July 17, 1956     A. P. DINSMORE     2,754,921

PROPELLER CONTROL

Filed Oct. 26, 1951     2 Sheets-Sheet 1

INVENTOR
ALBERT P. DINSMORE
BY
Willits, Hardman & Felix
his ATTORNEYS

July 17, 1956

A. P. DINSMORE 2,754,921

PROPELLER CONTROL

Filed Oct. 26, 1951

INVENTOR.
ALBERT P. DINSMORE
BY
Willits, Hardman & Fehr
his ATTORNEYS

United States Patent Office 2,754,921
Patented July 17, 1956

2,754,921
PROPELLER CONTROL

Albert P. Dinsmore, Dayton, Ohio, assignor to General Motors Corporation, Detroit, Mich., a corporation of Delaware Application October 26, 1951, Serial No. 253,257

21 Claims. (Cl. 170—160.21)

This invention relates to position and/or speed control of a variable load device, and has for an object to provide control means for adjusting the load to a particular position and for adjusting the load to accomplish a selected fixed speed setting of a prime mover for moving the load.

The control system is a composite governor and blade angle control for use with aircraft propellers on gas turbines. It is designed for use with electric valve propellers where it is desired to set and maintain, on the one hand, a selected speed or, on the other, a selected blade angle.

The system includes electronic components, an electric valve and propeller fluid system, and like any propeller governor, is basically a blade angle control, since any error information put into the control results in a change in blade angle.

When the system is operated as a governor, speed error information is put into the system, and blade angle is changed until the speed error is reduced to zero.

When the system is operated as a blade angle or beta control, blade angle error information is put into the system, and blade angle is changed until the blade angle error is reduced to zero.

Speed errors and blade angle errors, to which reference is made, can be due to normal changes in blade loading, or they can be introduced, for example by the pilot when a change in operating conditions is desired.

Further objects and advantages of the present invention will be apparent from the following description, reference being had to the accompanying drawings wherein a preferred embodiment of the present invention is clearly shown.

The aforementioned objects are accomplished by means of electronic components, selectively responsive to either speed information signals or position information signals, that produce corresponding electrical pulses which are transmitted to an electric valve. The electric valve controls a hydraulic system for effecting pitch changing movements of the propeller blades.

In the drawings:

Fig. 2 is a detailed circuit diagram of the principle elements of the control organization.

Fig. 4 is a modification of the reactive frequency sensitive network disclosed in Fig. 2.

Fig. 5 represents a diagrammatic view of the electrical pulses which are transmitted to the solenoid windings of an electric valve.

Figure 1:
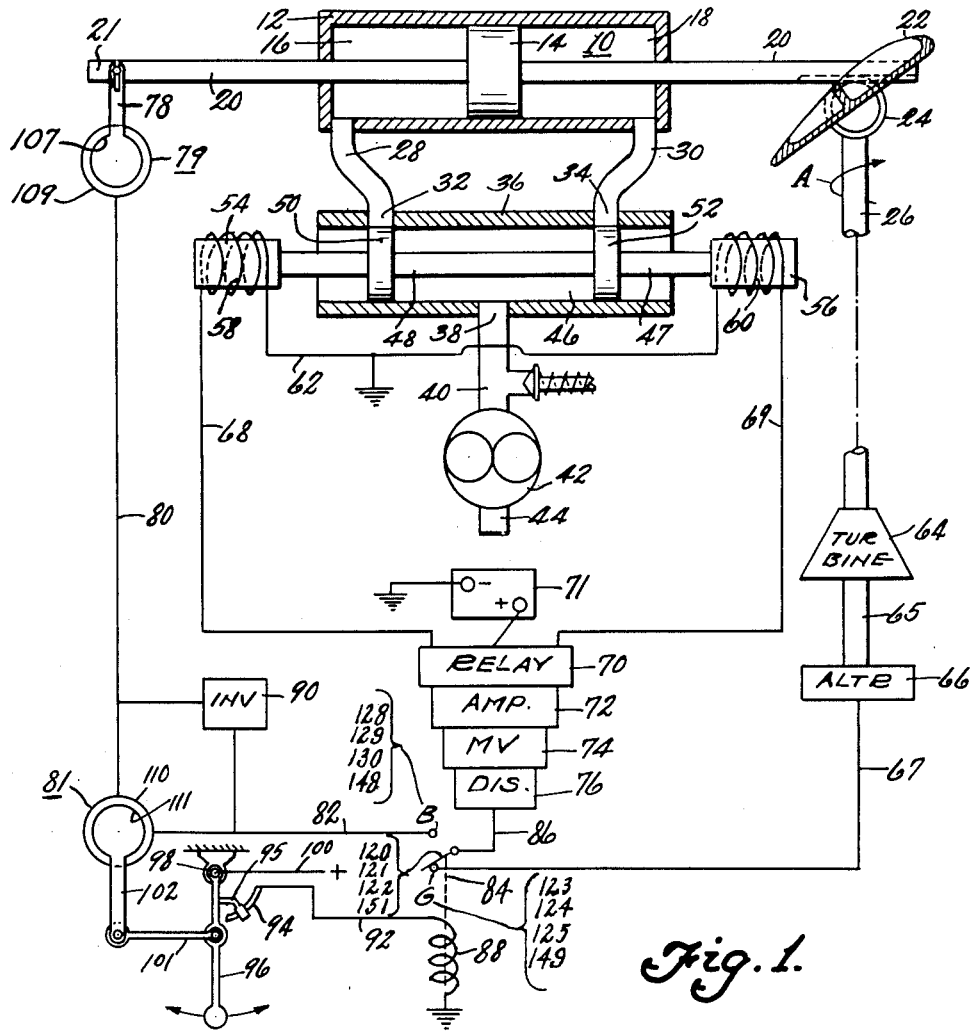
Fig. 1 is a combined schematic and block diagram illustrating an hydraulic organization for adjusting the load, and an electrical control organization providing control for the hydraulic organization.
Figure 3:
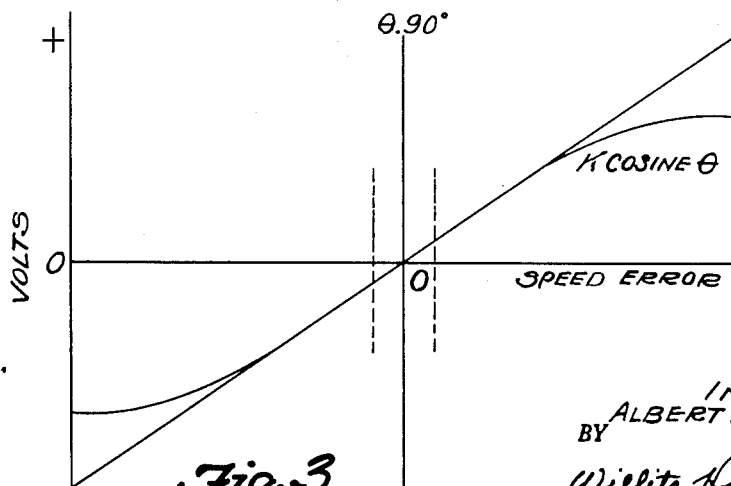
Fig. 3 is a curve illustrating certain features of the variable load control device.

In Fig. 1 is illustrated a simple diagram of the system showing the control organization in conjunction with a propeller-turbine installation. There are two alternate feed back circuits and a selectable means at the control to close either of two loops, in order to effect either a governor or a beta control.

The turbine is shown coupled to the propeller. An alternator driven by the turbine generates an alternating current whose frequency is proportional to turbine speed. In the case of governing, this alternator signal is delivered to a discriminator as the speed information for governing.

A rotatable control transformer of the type well known as autosyns or selsyns is coupled to the propeller blades. In combination with another similar unit, this selsyn system provides a signal which represents blade angle error or position information. In the case of blade angle control this signal is delivered to the discriminator as the blade angle information.

The discriminator is a circuit which interprets speed and blade angle information and, by a method of reference, develops voltages at its output terminals which are functions of speed error or blade angle error. These error voltages are delivered as bias voltages to a multivibrator pulser unit.

The multivibrator circuit, serves as the pulsing element to control the operation of the electric valve in the propeller. Error voltages applied as biases to the multivibrator alter its pulse ratio, which is normally unity, or 50–50, and produce corrective pulse ratios.

A relay is used as a power amplifier, and responding to the multivibrator pulse ratio, controls the operation of an electric valve, and hence blade angle.

In this manner, either turbine speed error or blade angle error is detected and used to change blade angle to diminish the speed error or the blade angle error.

Further, with specific reference to Fig. 1 a turbine 64 operates thru a shaft 26 to drive a propeller hub 24, having an adjustable blade 22, the propeller being driven in the direction indicated by the arrow A. The turbine 64 also drives thru shaft 65 an alternator 66 that provides an electrical output thru 67 which is an alternating current whose frequency is always proportional to turbine speed.

The pitch of the propeller blade 22 is adapted to be adjusted by a double acting servomotor 10 comprising a cylinder 12 and a piston 14 movable therein, the piston having a rod 20 adapted in its movement to adjust the pitch of the blade 22. The servomotor 10 provides within the cylinder 12 a pitch decrease chamber 16 and a pitch increase chamber 18. Chamber 16 is connected by passage 28 with a port 32 of an electrically operated valve 36 which also has a port 34 connected by passage 30 with a chamber 18. The electrically operated valve 36 movably supports a spool valve 48 provided with spaced lands 50 and 52 that normally and in a rest position completely stop fluid flow thru the ports 32 and 34. Fluid under pressure is provided by pump 42 from an inlet pipe 44 thru a delivery passage 40 to a port 38 of the electrically operated valve 36. Extending on opposite sides of the spool valve 48 there are provided armatures 54 and 56 disposed within solenoid coils 58 and 60, connected by a common lead 62 to ground and leads 68 and 69 to a relay 70. Relay 70 is connected to a battery 71 in order to control the operation of the electric valve 36, in accordance with signal pulses received from an amplifier 72 and produced by the multivibrator 74 under the control of a discriminator 76. Depending upon the signal received from the relay 70, one and then the other of the solenoids 58 and 60 will be energized for movement of the spool valve 48 in one direction and then the other to connect the ports 32 and 34 to the pressure supply port 38.

The plunger 20 of the blade adjusting servo 10 is prolonged at 21 or is otherwise provided with means 78 for movement of a rotor element 107 of a rotatable transformer or selsyn 79 electrically connected by 89 to a control transformer 81 that is connected by 82 to a terminal B of a relay 84 having a contact G in the circuit connection thru 67 to the alternator 66. A movable element of the relay 84 is connected by 86 as a signal input to the discriminator 76. A coil 88 is operable upon the relay 84 when energized to connect the discriminator 76 with the alternator 66 and when de-energized to connect the discriminator 76 with the control transformer 81.

The solenoid coil 88 has connection 92 to a contact 94 adapted to be engaged by contact 95 on control lever 96 when said lever 96 is moved into the governed speed range. The lever 96 is pivoted at 98 and is supplied with electric energy by a conductor 100. The manually controlled lever 96 is connected by link 101 and arm 102 with the rotor element of the selsyn or control transformer 81. When the control lever 96 occupies the position shown or any position further toward the right in the drawing the control organization will operate upon the fluid organization to effect turbine operation at a selected fixed speed. When the control lever 96 is moved to a position to the left from the position illustrated, wherein the electrical connection between contacts 94 and 95 is broken, the fluid organization will be controlled through the input of the selsyn system to effect propeller-turbine operation at some selected blade angle depending upon the position of the control lever 96.

Figure 2 shows a schematic representation of the control system. A transformer T1, with its primary 102, is connected to the alternator by relay 84 in the energized position, and discriminator tubes V1, V2, considered for the moment as simple rectifiers, are connected to the ends of the split secondary 103. If currents flow in the two halves of the secondary circuit and the circuit is balanced, then equal charges will appear on the condensers C1 and C2. These charges will be positive at points $a$ and $c$ with respect to point $b$. These equal potentials may be such that $+100$ volts appears at $d$ and $+100$ volts appears at $f$, or $+75$ at $d$ and $+75$ volts at $f$, depending upon circuit constants and the magnitude of the alternator voltage. However, so long as the circuit is balanced, these potentials are equal, and hence no potential difference exists across the output terminals $d$, $e$ and $f$.

Any means of unbalancing the circuit will result in unequal potentials across C1 and C2. If, for example, the circuit is unbalanced at tap T of the secondary 103 so that, with respect to point $e$, there exist under stable conditions potentials of $+101$ volts at point $d$, and $+99$ volts at point $f$, a potential difference of 2 volts appears between the output-terminals $d$, $e$ and $f$. In this case, due to current flow through the voltage divider R3, R4, and with respect to terminal $e$, terminal $d$ is at a potential of $+1$ volt and terminal $f$ is at a potential of $-1$ volt.

These equal voltages of opposite polarity are delivered to the multivibrator 74 as biases, which control pulse ratio in the manner described in copending application Ser. No. 94,984, now Patent No. 2,669,312, Dinsmore et al. The point $e$ of the resistor network R3 and R4 is connected to the cathodes of both tube sections of vacuum tube V3 of a multivibrator circuit, the point $d$ is connected to the grid of one tube section by means of resistors R11 and R12, and the point $f$ is connected to the grid of the other tube section by means of resistors R13 and R14. The potential difference between points $d$ and $e$ will appear as a grid bias on one tube section while the potential difference between points $e$ and $f$ will appear as a grid bias on the other tube section. Thus no bias voltages are developed by the discriminator when the circuit is balanced, and bias voltages developed under unbalanced conditions are employed as a means of control of the multivibrator circuit.

Two R–C filters, R1, C3 and R2, C4 are connected ahead of the multivibrator 74 to remove ripple voltages.

The multivibrator circuit is of conventional design using a double tube V3. A modification of the usual multivibrator circuit is provided in the form of bias controls on the symmetry of the multivibrator output signal. When the bias voltages applied to the grids of these two tube sections are zero, the circuit is a standard multivibrator circuit in which the wave form is square and symmetrical, and the pulse ratio may be considered as unity or 50:50. If, however, the bias on the grid of one tube section becomes slightly negative while the bias on the grid of the other tube section becomes slightly positive, the conduction times of the two tube sections are not equal and the signal wave form is unsymmetrical with the pulse ratio in other than 50:50 ratio (e. g. 60:40). The multivibrator produces a succession of electrical pulses or impulses that are alternately applied to the two solenoids of the electric valve. With reference to Fig. 5, P, P' and P'' illustrate the electrical pulses applied to solenoid 58 of the electric valve, and Q, Q' and Q'' illustrate the corresponding electrical pulses applied to solenoid 60 when the multivibrator is operating at a pulse ratio other than 50:50 or unity. When the lengths of pulses P, P' and P'' are equal to the lengths of pulses Q, Q' and Q'', pitch changing movement of the propeller blade will not be effected since the pulse ratio is 50:50 which represents an on-speed or on-position condition. Henceforth, by alternate electrical pulses to the electric valve I mean oppositely acting pulses P and Q or P' and Q' or P'' and Q'' which are applied to the opposite solenoids of the electric valve. Thus, it may be said that the alternate pulses are of equal or unequal time durations, respectively, when the waveform is symmetrical or unsymmetrical. This action may be reversed by reversing the relation of the bias voltages.

GOVERNOR

$K_1$, first order control

In Fig. 2 the position of relay 84 shown is that for speed governing of a power plant. The on-speed condition is represented by the application of zero bias signals from the discriminator output terminals $d$, $e$ and $f$ upon the tube sections of the multivibrator which will effect a 50:50 pulse ratio. An overspeed condition will subsequently be shown to produce a positive bias voltage to be delivered to one tube section, and in similar manner the other tube section will receive a negative bias from the discriminator. These bias voltages make the conduction time of one tube section shorter, and that of the other tube section longer, thus producing a corrective pulse ratio, for example 40:60. Continuously increasing overspeed will produce other ratios of 30:70, 20:80 etc., until one tube section becomes continuously conducting while the other tube section becomes inactive, and pulsing ceases. On the other hand, a continuously increasing underspeed condition of the power plant will effect a reversal of the action of the tube sections and pulsing ratio (e. g. 60:40, 70:30, 80:20 etc.), ultimately resulting in the other tube section becoming continuously conductive with a cessation of pulsing action. The multivibrator 74 is followed by a direct coupled amplifier stage 72 operated at a power level sufficient to drive the relay 70. The relay is a polarized relay with contacts 136, 137 and 138 impressed with current suitable for operating the solenoids 58, 60 of valve 36. A pair of selenium rectifiers 139, 140 are connected across the valve circuit 68, 69 for arc suppression to protect the relay contacts.

By this means, the character and magnitude of potentials appearing at the output terminals $d$, $e$, $f$, of the discriminator constitute control signals that are transmitted to the mulivibrator or pulse producing means 74, where there is produced, depending upon the control signal received, a succession of alternate, electrical pulses, that are equal during on-speed or on-position conditions, and unequal differentially during off-speed conditions and off-position conditions. Those pulses are amplified in the same time proportion by 72 and delivered to the winding 141 of the relay 70 for impression in like character and direction upon the leads 68 and 69 for energizing the coils 58, 60 of the electric valve 36.

Figure 2 shows the circuit using double triode vacuum tubes V1 and V2 as phase controlled rectifiers. These two-section tubes are connected in parallel in the discriminator circuit to reduce the effective plate resistances, and at the same time reduce the effects due to change in cathode conditions with aging. In this circuit the grids of the two tubes are tied together in a circuit including R9 and R10, and connected by 105, 104, 122, 125, 152 to a reactive frequency sensitive network consisting of C and R, values of which are chosen to produce a quadrature signal at the frequency representing the desired speed. At this frequency the reactance of C is exactly equal to the resistance R, and the voltage to the grids leads the voltage on one pair of plates by 90 electrical degrees, and lags the voltage on the other pair of plates by 90 electrical degrees. Conduction times are therefore equal in both pairs of tubes, and equal and opposite potentials are developed across the cathode capacitors C1 and C2. This represents the balance condition, and there exists no potential difference across the output terminals. This balance condition occurs at only one alternator frequency, and therefore at only one turbine speed. The system operates then as a frequency sensitive governor. If greater frequency sensitivity is desired, an inductance may be substituted for the resistance R of the reactive network. In such case this L–C network will produce quadrature signals when the alternator signal frequency is equal to the resonant frequency of the L–C combination. It is obvious further, that any network or circuit which serves the same purpose may be substituted for the R–C network.

If turbine speed is reduced for any reason, the reactance of C is increased. This results in a phase shift, setting the phase difference between the plate and grid voltages of one pair of tubes at a value less than 90 degrees, and that of the voltages to the other pair of tubes at a value greater than 90 degrees. Conduction times are now unequal, the potentials developed are unequal, and corrective biases appearing at terminals $d$, $e$ and $f$ are delivered to the multivibrator to call for an increase in speed. For a speed error of opposite sign the reactance of C is decreased and the correction is made conversely toward reduction in speed. The discriminator, therefore, is a phase sensitive detector, responsive to speed information signals.

If $\theta$ equals the phase angle of the grid signal with respect to one plate signal, the potential which appears across the output terminals from $d$ to $f$ is $$E_{df} = K E_p E_g \cos \theta$$

Hence the error signals produced by the discriminator are proportional to plate voltage $E_p$, grid voltage $E_g$ and the cosine of the angle $\theta$ between these voltages. These D. C. signals, and resulting blade angle correction rates in normal governing, are very nearly proportional to speed error at any instant. This proportionality is an approximation since in addition to the cosine error the alternator voltage may be a function of speed. However, these errors are negligible in the normal range of governing.

This first order control constant, designated $K_1$, may be written, $$K_1 = \frac{\frac{d\beta}{dt}}{N_t - N_s}$$

or the proportionality between rate of change of propeller blade angle and error between turbine speed and governor speed setting.

Governor speed setting is a matter of selection of values of C and of R to produce the quadrature signal at the desired speed, and continuous adjustment, is possible if R, or a part of R, is a variable resistance.

$K_2$, Second order control

Differentiating circuits are connected between the R–C filter and the multivibrator 74 when rate sensitivity is desired. The equal voltages of opposite sign which appear between the points $d$ and $e$, and between points $e$ and $f$, are directly proportional to speed error at any instant. The error voltage developed across C3 is differentiated by the CR network consisting of C5 and R3, and the voltage developed across C4 is differentiated by C6 and R4. Across R3 and R4, then voltages appear during speed changes which are rate signals for control of multivibrator pulse ratio. This second order control, designated $K_2$, may be written, $$K_2 = \frac{\frac{d\beta}{dt}}{\frac{dN}{dt}}$$

or the proportionality between the rate of change of propeller blade angle and rate of change of turbine speed.

$K_2$ may be varied (separately) by varying the capacitance of C5 and C6.

By the inclusion of resistances R5 and R6, it may be seen that both $K_1$ and $K_2$ voltages appear across resistances R3 and R4. In this manner the governor has both $K_1$ and $K_2$ control constants.

$K_1$ and $K_2$ may be varied (simultaneously) by varying the resistances R3, R4, R5 and R6, and also by varying the alternator voltage or the transformer turns ratio. Any change in alternator voltage, for example, will make a proportionate change in $K_1$ and $K_2$. Also, if the system is initially adjusted to six tenths critical damping, this damping ratio is unaffected by supply voltage and remains constant in spite of changes in alternator voltage due to any cause.

$K_3$, third order control

When synchronization is required, or when greater precision is required in the control, a third order control may be employed, whereby small residual governing errors may be sensed and corrected. Blade angle corrections proportional to the time integral of these errors may be accomplished in a manner described in copending application Ser. No. 94,984 (etc.). This integral type control (system) comprises a three tube, three phase comparator 147 circuit operating a three phase stepping motor which is coupled through a gear reduction to a variable resistance connected in turn into the governor loop as a limited speed control device. This comparator serves as a frequency comparison means to operate the motor at a rotational speed at all times commensurate with any difference or error which may exist between the frequency of the alternator and the frequency of a stable reference oscillator, 146.

In Fig. 2 the stepping motor 142 and its associated gear box 143 are represented with a mechanical coupling to the movable arm 149$b$ of potentiometer R23. The potentiometer R23 is connected into the cathode circuit of the amplifier stage V4, to form a bridge circuit and thereby to balance the direct coupled amplifier V4. The resulting control of balance in the plate circuit of the multivibrator stage, exerts influence directly on pulse ratio of the latter, and thereby controls blade angle directly.

This third order control, designated $K_3$, may be written, $$K_3 = \frac{\frac{dNg}{dt}}{N_{mr} - N_{pm}}$$

or the proportionality between rate of change of governor setting, and error between a master reference speed index and prime mover speed.

There is no essential difference in performance in the present system whether the $K_3$ be applied as a precise position control directly or as a phasing control in the discriminator to reset the governor. When used as a precise position control, $K_3$ is independent of the discriminator and thereby avoids complication of the speed sensing circuits. When used as a governor reset, $K_3$ may be applied to the reactance network as is shown in Fig. 4, wherein the motor 142 and its associated gear box 143 are mechanically coupled to movable arm 144 of variable resistance R22. The degree and extent of $K_3$ control may be varied by varying the stepping motor reduction gear ratio, and/or the value of the associated resistances R23 or R22.

Thus the governor circuit described has K₁, K₂ and K₃, and is capable of fast, accurate and stable governing.

*Blade angle control*

In blade angle control, or for beta operation as it is sometimes referred to, the relay 84 is in the de-energized position. In reference to Fig. 1, that relay is de-energized whenever the pilot's control lever 96 is moved to a position to disengage contacts 94 and 95. The input to discriminator is then from wire 82 to contact B.

In Fig. 2 a selsyn unit 79 installed in the propeller has its rotor 107 powered from a transformer T3 connected in turn to a 400 cycle source 108 and is coupled to the blades by 78. It has a stator 109 electrically connected through slip rings to the stator 110 of another selsyn 81 in a null system which permits blade angle error signals to be developed across the rotor 111 of the second selsyn 81. Such signals are proportional in amplitude to blade angle error, and undergo a complete, 180° phase reversal in crossing the null at zero error. These signals are interpreted in the discriminator by a method of comparison with the same 400 cycle power source 108. The discriminator unit has already been described as a phase sensitive detector, with output potentials suitable for control of the multivibrator.

There are two differences between operation of the discriminator 76 as a beta control and operation as a governor. When operated as a beta control, the discriminator supply is from the 400 cycle source, 108. It is not frequency sensitive, but is sensitive to the phase and amplitude of the selsyn signal, as will be explained later. Moreover, as a beta control movable arm 149a of potentiometer R23, shown in Fig. 2, is rendered ineffective to vary the pulse ratio, since when relay 84 is de-energized, movable arm 151 connects contact 148 and a fixed center tap 160 to the supply source.

The selsyn system as used to furnish blade angle error information, is connected by means of relay 84 to the grids of V1, V2 instead of the alternator in the governor system already described.

Selsyn stator 109 is connected to selsyn stator 110 in the conventional fashion. The rotor 107 is supplied with a suitable source of 400 cycle power by transformer T3, connected to supply 108. A signal appears across the terminals of rotor 111 by transformer action. As either rotor is continuously rotated the amplitude of this signal across rotor 111 varies sinusoidally, with two nulls appearing 180° apart, and a phase reversal at each null. The positions of the nulls depend upon the position of the other rotor.

The selsyn stator 109 is fixed in the propeller hub, and the rotor 107 is connected to the propeller blades in such a way that a change in blade angle causes a change in position of rotor 107 relative to stator 109. Such a change produces a change in the signal appearing across rotor 111, and for a given blade angle setting, a null position of rotor 111, can be found corresponding to that blade angle. The selsyn stator 109 on the rotating propeller is connected through slip rings to selsyn stator 110 which is installed in the control unit. By this arrangement rotor 111 furnishes blade angle information to the discriminator 76. This blade angle information, then, is in the form of a 400 C. P. S. voltage which is proportional to blade angle error, and which may be zero, or any finite value.

From the formula for the corrective bias voltages appearing at the output of the discriminator, $$E_{df} = KE_p E_g \cos \theta$$

the $E_p$ is now supplied from the 400 cycle source 108, the $E_g$ is this error voltage (with the phase reversal at zero error acting as a change of sign), and since $\theta$ is either 0° or 180° with cos $\theta$ always unity, when a small error exists, the corrective bias $E_{df}$ is proportional to the blade angle error.

It is therefore obvious that when the error voltage is in phase with the plate supply voltage to one pair of discriminator tubes, more plate current will flow through those tubes, a greater voltage will be developed on that side of the circuit than on the other, and a condition of unbalance exists in the discriminator which will effect a change in the pulse ratio of the multivibrator to produce a proportional correction in blade angle.

In operation, for a given setting of rotor 111, if rotor 107 is misaligned due to a blade angle error, a control voltage will appear across rotor 111, which acts thru transformer T2 the output of which is impressed on the discriminator circuit which will control the multivibrator to effect a blade angle change. The stabilizing rate control circuits, described above as K₂, are still active in beta control, and provide corrections also proportional to the rate of change of blade angle error. Rotor 107 is rotated by the blades as they turn to that position wherein the control is satisfied, and the signal is reduced to zero (at zero error). The system will function identically in both directions, and so will maintain that blade angle, corresponding to the given setting of rotor 111. Blade angle can be changed at any time, by means of lever 96 and link 101, resetting rotor 111 to insert an error, as it were. The system therefore is a stable blade angle control with correction rates proportional to blade angle error and also to rate of change of blade angle error.

THE COMPLETE CONTROL SYSTEM

A relay 84 is shown to select one or the other of the two loops, governor and beta control, for the type of control desired. The relay 84 has four movable contact members 120, 121, 122 and 151 engageable with front contacts 123, 124, 125 and 149, respectively, for completing the governor control loop. Contacts 123 and 124 are connected by wires 126 and 127 across one of the phases of the alternator 66 as indicated in Fig. 1, so that when engaged by the movable contacts of the switch 84, the primary 102 of the transformer T1 will be energized by the alternator output. Front contact 125 when engaged by movable contact 122 connects by 104 and 105 the signal grids of tubes V1 and V2 with the phase network CR. Front contact 149, when engaged by movable contact 151, connects a positive 30-volt D. C. source of current to movable potentiometer arm 149b through wire 149a. The movable contacts 120, 121 and 122 are engageable with back contacts 128, 129, 130 and 148, respectively, for completing the blade angle control loop. Contacts 128 and 129 connect by wires 131 and 132 with the 115 volt, 400 C. P. S. source of current indicated at 108 so that primary 102 is energized by 400 C. P. S. current. Contact 130 when engaged by movable contact 122 connects by wires 104, 133 and 134, a secondary 135 of the transformer T2 between the cathodes and grids of the tubes V1 and V2. Contact 148 when engaged by movable contact 151 connects a positive 30-volt source of current to a fixed center tap 160 on potentiometer R23 through wire 148a.

A coil 88 is provided for actuating the relay 84. In the energized position (shown) the system will govern, since the grids of the discriminator 76 are connected to the R–C network and the transformer primary 102 is connected to the alternator.

On the alternator 66 a Y connected, resistive load, R19, R20 and R21, is connected at the control. If these resistances are low and the input impedance of the governor is high, it is apparent that, in event of failure of any one of the conductors in cable 67 to the alternator 66, the transformer T1 will be furnished with a sizeable fraction of the alternator voltage and the governor control constants in such case will only be reduced in proportion to this reduction in supply voltage. When the coil 88 is de-energized for beta control, the transformer T1 is powered from the 400 C. P. S. inverter 108, and the grids are switched to the selsyn signal, which is stepped up by transformer T2.

There is thus provided a control system which embodies speed control from the alternator when the relay coil 88 is energized, and position control from the blade angle controller 81 when the relay coil is deenergized. The speed control embodies means such that the rate of change of blade angle is proportional to speed error, rate of change of speed erorr and the error between a master reference speed index and prime mover speed. The position control embodies means such that the rate of change of blade angle is proportional to blade angle error and rate of change of blade angle error. During an on-speed condition and during an on-position condition the output wave-form of the multivibrator 74 is symmetrical, the pulse ratio is 50:50 and equal pulses are continuously supplied to the solenoids 58 and 60 in alternation. The solenoids 58 and 60 operate the valve 48 to alternately connect control ports 32 and 34 with a source port 38 thereby providing pulsed flows of fluid to the blade angle servomotor 10. Since the resulting pulsed flows of fluid from ports 32 and 34 are equal there is no net change in mean blade angle. However, when an error in speed or blade position is detected by the discriminator 76 the output wave-form of multivibrator 74 is rendered unsymmetrical in its pulse duration. If, for example, there is an underspeed condition, the pulse ratio may now be 60:40, and as the valve 36 is pulsed the 60% pulse goes to solenoid 58 and the 40% pulse goes to solenoid 60. The spool valve 48 is caused to dwell a relatively longer time at the left end of its travel, as seen in Fig. 1, and the resulting pulsed flow from port 32 is greater than that from port 34. Thus, a net change in mean blade angle is effected in the decrease pitch direction to produce a speed increase. On the other hand, if there is an off-position condition the pulse ratio will be other than 50:50. For example, if the blade angle is too low when the valve 36 is pulsed, the larger pulse will go to solenoid 60 and the shorter pulse to the solenoid 58. The spool valve 48 would then have a longer dwell in opening port 34 and the blade angle servo 10 would be so operated to increase the blade angle.

Certain design considerations will dictate deviations from the present design, and may include, at least an adjustment of the $K_1$, $K_2$ and $K_3$ constants. When the blade angle control circuit is seelcted, the potentiometer arm 149 in Fig. 2 is ineffective to vary the blade angle control signals.

While I have described the various phases of my invention with some particularity, it will be understood that I do not limit myself except as determined by the claims, since various changes may be made in details and arrangement of parts without departing from the spirit of the invention, among which, the governor control constants may be varied as explained to accommodate characteristics peculiar to any desired installation.

The governor may be arranged to govern at any selected fixed speed setting.

The governor may have instead, or in addition, a means of continuous speed control, manually controlled or automatically scheduled.

The governor-beta relay may be controlled remotely by means of a manually operated switch, or controlled automatically in conjunction with a coordinated power control.

The governor-beta relay may be operated in either direction, at any time, and as often as the pilot or a scheduled control system calls for a change in the type of propeller control.

While the embodiments of the present invention as herein disclosed, constitutute a preferred form, it is to be understood that other forms might be adopted .

What is claimed is as follows:

1. Control means for a prime mover driven propeller having adjustable blades comprising in combination, a fluid organization in the propeller for adjusting the blades in response to control signals, said fluid organization including an electrically operable for controlling the adjustment of the blades, a control organization operable to actuate said valve, said control organization including a fixed speed controller operable to provide output speed control signals proportional to prime mover speed, a selective blade angle controller operable to provide output position control signals proportional to the blade position, means having an input connectible to the output control signals of both controllers for interpreting speed control signals and position control signals and for developing output correction signals which are functions of speed error and position error respectively, means applying the output of said interpreting means to said electrically operable valve for actuating the same, and means for selecting one of the controllers, each in lieu of the other, by which the blades of the propeller will be adjusted.

2. A control means for a turbine driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including pulse producing means having an output comprising alternate electrical impulses for actuating the valve, equal during on-speed conditions and during on-position conditions, and unequal during off-speed conditions and during off-position conditions, a fixed speed controller operable to provide output on-speed and off-speed control signals, a selective blade angle controller operable to provide output on-position and off-position control signals, means having an input connectible to the output control signals of both controllers for interpreting speed control signals and position control signals and for developing output correction signals which are functions of speed error and position error respectively, means applying the output correction signals of said interpreting means to the input of said pulse producing means for controlling the output thereof, and means for selecting one of the controllers, each in lieu of the other, by which the blades of the propeller will be adjusted.

3. Control means for a prime mover driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including a governor comprising pulse producing means having an output comprising, alternate electrical impulses for operating the valve, equal during on-speed conditions and unequal during off-speed conditions, and a discriminator having an output connected to the input of said pulse producing means for controlling the output thereof in response to input speed information, an alternator driven by the prime mover for generating an A. C. current whose frequency is proportionate to prime mover speed constituting said speed information, and means applying the A. C. current to the input of said discriminator for controlling the output thereof.

4. The combination set forth in claim 3, wherein, the governor is frequency sensitive, and includes means responsive to speed information from the alternator for producing off-speed signals to the pulse producing means to obtain a rate of change of propeller blade angle in proportion to speed error.

5. The combination set forth in claim 3, wherein the discriminator is a phase sensitive detector and includes rate circuits for producing control signals to the pulse producing means so that rate of change of propeller blade angle is in proportion to the rate of change of prime mover speed.

6. The combination set forth in claim 3, wherein the control organization includes means for modifying the pulse ratio to reset the governor at a rate proportional to the error between a master reference speed index and prime mover speed.

7. The combination set forth in claim 3, wherein the discriminator includes means for modifying the input to the pulse producing means in proportion to the rate of change of prime mover speed.

8. Control means for a turbine driven propeller having adjustable blades, comprising in combination, a fluid organization in the propeller for adjusting the blades in response to control signals, said fluid organization including a reversible, electrically operable valve for controlling the adjustment of the blades, a control organization operable to actuate said valve, said control organization including means having an output comprising, alternate electrical impulses for operating the electric valve, equal during on-speed conditions and unequal during off-speed conditions, a discriminator having an output connected to the input of the pulse producing means for controlling the output thereof in response to input speed information signals, an alternator driven by the turbine for generating an A. C. current whose frequency is proportional to turbine speed constituting said speed information signals, means applying said speed information signals to the input of said discriminator for controlling the output thereof, and a selective blade angle controller providing blade angle information as an alternate input to said discriminator for blade position control, and means for selecting either the blade angle control or the speed control each in lieu of the other.

9. Control means for a turbine driven propeller having adjustable blades, comprising in combination, a fluid organization in the propeller for adjusting the blades in response to control signals, said fluid organization including a reversible, electrically operable valve for controlling the adjustment of the blades, a control organization operable to actuate said valve, said control organization including means having an output comprising, alternate electrical impulses for operating the valve, equal during selected conditions and unequal during deviation from said selected conditions, a discriminator having an output connected to the input of the pulse producing means for controlling the output thereof, said discriminator being selectively responsive to either input speed information or input blade position information, an alternator driven by the turbine for generating an A. C. current whose frequency is proportional to turbine speed constituting said speed information, means including a selsyn system providing said blade position information, and means for applying either blade position information or speed information to the discriminator input for controlling the discriminator output.

10. Control means for a turbine driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including a source of alternating current, a blade angle controller having a selsyn system energized by said source of alternating current comprising, a first stator-rotor combination mounted in a propeller for relative rotation upon adjustment of the blades and a second stator-rotor combination, one element of which is relatively rotatable in selecting a particular blade position, a discriminator having an input responding to control signals established by said selsyn system and having an output for controlling the operation of said valve in accordance with position information from said selsyn system, means applying the selsyn system output to the discriminator input for controlling the discriminator output, and means applying the discriminator output to the input of said electrically operable valve.

11. Control means for a prime mover driven propeller having adjustable blades, comprising in combination, a fluid organization in the propeller for adjusting the blades in response to control signals, said fluid organization including an electrically operable valve for controlling the adjustment of the blades, a control organization operative to actuate said valve, said control organization including a source of alternating current, a blade angle controller having a selsyn system energized by said source of alternating current comprising, a first stator-rotor combination mounted in the propeller for relative rotation upon adjustment of the blade and a second stator-rotor combination, one element of which is relatively rotatable in selecting a particular blade position, a discriminator having an input responding to control signals established by said selsyn system and having an output for controlling the operation of said valve in accordance with position information from said selsyn system, means applying the selsyn system control signals to the discriminator input for controlling the discriminator output, and means applying the discriminator output to the input of said electrically operable valve, a speed sensitive controller providing speed information as an alternate input to said discriminator for speed control of the prime mover combination, and means for selecting either the blade angle controller or the speed sensitive controller.

12. Control means for a prime mover driven propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including pulse producing means having an output comprising, alternate electrical impulses for operating the electric valve, equal during selected blade angle conditions and unequal during blade angle deviations from said selected blade angle conditions, means constituting an alternating current circuit, means operatively connected with said blades for modifying the current in said circuit in accordance with the position of said blades, a discriminator having an output connected to the input of said pulse producing means for controlling the output thereof, and means connecting said alternating current circuit to the discriminator input for controlling the discriminator output in response to a position of said blades.

13. The combination set forth in claim 12 wherein the control organization includes means that are amplitude and phase sensitive and respond to blade position information for supplying off-position signals to the input of said pulse producing means to obtain a rate of change of propeller blade angle in proportion to blade angle error.

14. The combination set forth in claim 12 wherein the control organization includes rate circuits for supplying control signals to the input of said pulse producing means so that the rate of change of propeller blade angle is in proportion to the rate of change of propeller blade angle error.

15. Control means for a prime mover propeller having adjustable blades, comprising in combination, a fluid organization in the propeller for adjusting the blades in response to control signals, said fluid organization including an electrically operable valve for controlling the adjustment of the blades, a control organization operable to actuate said valve, said control organization including pulse producing means having an output comprising alternate electrical impulses for operating the electric valve, equal during on-speed and on-position conditions and unequal during off-speed and off-position conditions, a discriminator interpreting speed and position information and having an output connected to the input of the pulse producing means for controlling the output thereof, means for generating an A. C. current whose frequency is proportional to prime mover speed constituting said speed information to the discriminator for governing, means including a selysn system providing blade angle information for blade position control, and means for applying either the speed information or the blade angle information to the discriminator input for controlling the discriminator output.

16. Control means for a prime mover driven propeller having adjustable blades comprising in combination a fluid organization in the propeller for adjusting the blades in response to control signals, said fluid organization including an electrically operable valve for controlling the adjustment of the blades, a control organization operable to actuate said valve, said control organization including pulse producing means having an output connected to said valve for effecting operation thereof, and means having an output connected to the input of the pulse producing means for controlling the output of the pulse producing means such that the rate of change of blade angle is proportional to speed error and to the rate of change of speed error, said last-recited means also modifying the output of said pulse producing means in proportion to the error between a master reference speed index and prime mover speed.

17. Control means for a prime mover driven propeller having adjustable blades, comprising in combination, a fluid organization in the propeller for adjusting the blades in response to control signals, said fluid organization including a reversible, electrically operable valve for controlling blade adjustment, a control organization operable to actuate said valve, said control organization including pulse producing means having an output comprising, alternate electrical impulses for operating said valve, equal during on-speed conditions and unequal during off-speed conditions, a discriminator having an input receiving speed information signals and having an output connected to the input of the pulse producing means for controlling the output thereof, an alternator driven by the prime mover and generating A. C. signals constituting said speed information signals, the frequency of said A. C. signals being proportional to prime mover speed, a discriminator input circuit including a frequency sensitive network, preset to a frequency representing desired speed, and means applying said speed information signals to said discriminator input circuit, the discriminator output being controlled by the difference between the preset frequency and the frequency of said speed information signals.

18. Control means for a prime mover driven propeller having adjustable blades, comprising in combination a fluid organization in the propeller for adjusting the blades in response to control signals, said fluid organization including a reversible, electrically operable valve for controlling blade adjustment, a control organization operable to actuate said valve, said control organization including pulse producing means having an output comprising, alternate electrical impulses for operating said valve, equal during on-speed conditions and unequal during off-speed conditions, a discriminator having an input receiving speed information signals and having an output connected to the input of the pulse producing means for controlling the output thereof, an alternator driven by the prime mover and generating A. C. signals constituting said speed information signals, the frequency of said A. C. signals being proportional to prime mover speed, a discriminator input circuit including a pair of circuits, one circuit being directly coupled to the discriminator input for applying the speed information signals thereto, the other circuit including a frequency sensitive, phase shift network for producing phase shifted speed information signals during off-speed conditions, means applying the speed information signals from said other circuit to said other discriminator input, said discriminator being a phase sensitive detector for comparing the signals in said two circuits, the output of said discriminator being controlled by the phase difference between the signals in said two circuits.

19. Control means for a prime mover driven propeller having adjustable blades, comprising in combination, a fluid organization in the propeller for adjusting the blades in response to control signals, said fluid organization including a reversible, electrically operable valve for controlling blade adjustment, a control organization operable to actuate said valve, said control organization including pulse producing means having an output comprising, alternate electrical impulses for operating said valve, equal during on-speed conditions and unequal during off-speed conditions, a discriminator having an input receiving speed information signals and having an output connected to the input of the pulse producing means for controlling the output thereof, an alternator driven by the prime mover and generating A. C. signals constituting said speed information signals, the frequency of said A. C. signals being proportional to prime mover speed, said discriminator including a frequency sensitive input circuit, and means applying said speed information signals to said input circuit, said input circuit having an output connected to the discriminator input for controlling the discriminator output in proportion to the disparity between the frequency of said speed information signals and the resonant frequency of said input circuit.

20. In speed control mechanism for a prime mover, the improvement including an alternator driven by the prime mover and generating A. C. signals, the frequency of A. C. signals being proportional to prime mover speed, a pair of circuits connected with the output of said alternator, a discriminator having an input from said pair of circuits, one of said circuits being directly coupled to the input of said discriminator, the other circuit including a frequency sensitive, phase shift network for applying phase shifted speed signals to the discriminator input, said discriminator being a phase sensitive detector for comparing said two phases and having an output controlled by the phase difference between said two signals which is proportional to prime mover speed error, differentiating rate circuits having an input connected to the output of said discriminator and an output proportional to the rate of change of prime mover speed, pulse generating means having an output controlled by the outputs of said discriminator and said rate circuits for adjusting the speed of said prime mover, and means connected to the output of said pulse generating means for modifying the output of said pulse generating means in proportion to the error between a master reference speed index and prime mover speed.

21. Control means for a prime mover driven propeller having adjustable blades comprising in combination, a fluid organization in the propeller for adjusting the blades in response to control signals, said fluid organization including an electrically operable valve for controlling the adjustment of the blades, a control organization operable to actuate said valve, said control organization including a governor comprising pulse producing means having an output connected to said valve for effecting operation thereof, means having an output connected to the input of said pulse producing means for controlling the output of the pulse producing means such that the rate of change of blade angle is proportional to the rate of change of speed error, and means for modifying the governor speed setting in proportion to the error between a master reference speed index and prime mover speed.

References Cited in the file of this patent

UNITED STATES PATENTS

| | | |
|---|---|---|
| 2,065,565 | Crosby | Dec. 29, 1936 |
| 2,352,847 | Baumann | Aug. 14, 1945 |
| 2,410,659 | Hoover | Nov. 5, 1946 |
| 2,414,103 | Hunter | Jan. 14, 1947 |
| 2,448,007 | Ayres | Aug. 31, 1948 |
| 2,478,279 | Kochenburger | Aug. 9, 1949 |
| 2,510,296 | Root | June 6, 1950 |